US012812301B2

(12) United States Patent
Ghannam et al.

(10) Patent No.: US 12,812,301 B2
(45) Date of Patent: Nov. 24, 2026

(54) AUTOMOTIVE SOUND DISTRIBUTION AND SEATING MANAGEMENT FOR BILATERAL HEARING DIFFERENCES

(71) Applicant: FORD GLOBAL TECHNOLOGIES, LLC, Dearborn, MI (US)

(72) Inventors: Mahmoud Yousef Ghannam, Canton, MI (US); Aed Dudar, Canton, MI (US); Rami Al Khatib, Dearborn, MI (US); John R. Van Wiemeersch, Novi, MI (US); Mansoor Nasir, Canton, MI (US)

( * ) Notice: Subject to any disclaimer, the term of this patent is extended or adjusted under 35 U.S.C. 154(b) by 121 days.

(21) Appl. No.: 18/814,965

(22) Filed: Aug. 26, 2024

(65) Prior Publication Data

US 2026/0059240 A1 Feb. 26, 2026

(51) Int. Cl.

| | |
|---|---|
| ***H04R 3/12*** | (2006.01) |
| ***B60W 50/14*** | (2020.01) |
| ***H04R 1/40*** | (2006.01) |
| ***H04R 29/00*** | (2006.01) |

(52) U.S. Cl.

CPC ............... *H04R 3/12* (2013.01); *B60W 50/14* (2013.01); *H04R 1/403* (2013.01); *H04R 29/002* (2013.01); *B60W 2050/143* (2013.01); *B60W 2540/221* (2020.02); *H04R 2430/01* (2013.01); *H04R 2499/13* (2013.01)

(58) Field of Classification Search

CPC ........ H04R 1/403; H04R 3/12; H04R 29/002; B60W 50/14; B60W 2050/143

See application file for complete search history.

(56) References Cited

U.S. PATENT DOCUMENTS

| | | | | |
|---|---|---|---|---|
| 6,748,308 | B2 * | 6/2004 | Losey | E05F 15/71 454/75 |
| 9,386,381 | B2 * | 7/2016 | Tehrani | H04R 25/554 |
| 10,405,095 | B2 | 9/2019 | Eichfeld et al. | |
| 10,966,027 | B2 * | 3/2021 | Valeri | G06V 20/58 |
| 11,492,005 | B1 * | 11/2022 | Bond | B60W 40/08 |
| 11,794,770 | B1 | 10/2023 | Ghannam et al. | |
| 11,856,367 | B2 | 12/2023 | Feilner et al. | |

(Continued)

FOREIGN PATENT DOCUMENTS

| | | | |
|---|---|---|---|
| WO | 2012097150 | A1 | 7/2012 |
| WO | 2022248397 | A2 | 12/2022 |
| WO | 2024006330 | A1 | 1/2024 |

*Primary Examiner* — Paul W Huber

(74) *Attorney, Agent, or Firm* — Frank Lollo; Eversheds Sutherland (US) LLP

(57) ABSTRACT

Various sounds are reproduced in a passenger cabin of a transportation vehicle with a plurality of positions for seating respective persons who may have differential hearing losses between a right ear and a left ear. A dominant ear and a nondominant ear are identified of a particular user in a respective seating position. Electrical audio signals are generated in a sound source intended for reproduction by an array of speakers disposed within the passenger cabin for directing reproduced sounds toward the seating positions from respective directions. The audio signals are differentially adjusted before sending them to the array of speakers such that reproduced sounds directed to the nondominant ear are attenuated in relation to the reproduced sounds directed to the dominant ear (i.e., the sound to the dominant ear is enhanced).

20 Claims, 6 Drawing Sheets

(56) References Cited

U.S. PATENT DOCUMENTS

| | | | | |
|---|---|---|---|---|
| 11,900,941 | B1 * | 2/2024 | Harper | G10L 15/26 |
| 12,063,476 | B2 * | 8/2024 | Kubiak | H04R 25/50 |
| 2012/0189130 | A1 | 7/2012 | Lee et al. | |
| 2019/0281402 | A1 | 9/2019 | Schmidt et al. | |
| 2020/0066070 | A1 | 2/2020 | Wells | |
| 2020/0396553 | A1 * | 12/2020 | Van Wiemeersch | G06V 40/12 |
| 2021/0104134 | A1 | 4/2021 | Kurtovic et al. | |
| 2022/0233105 | A1 * | 7/2022 | Wheeler | A61B 5/0077 |
| 2023/0217167 | A1 * | 7/2023 | Salter | H04R 1/025<br>381/86 |

* cited by examiner

AUTOMOTIVE SOUND DISTRIBUTION AND SEATING MANAGEMENT FOR BILATERAL HEARING DIFFERENCES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to sound distribution systems in automotive vehicles, and, more specifically, to customizing sound distribution according to differential hearing loss of one or more users in the vehicle.

Various technologies have been adopted to provide assistance to drivers of transportation vehicles who may be subject to certain disabilities. To assist a driver or passengers with a hearing loss affecting certain frequencies, for example, vehicles have been adapted to generate alert tones (e.g., for a blind spot detection and alert system) having a frequency content avoiding the frequencies where the driver experiences the loss. The sound (e.g., sirens) generated by emergency vehicles can be detected using exterior microphones on a vehicle so that a hearing impaired driver can be informed of the detection of a siren using text or icons on a display (e.g., heads-up display or steering wheel-mounted LEDs). The visual alert can also show the direction toward the sound source. As shown in U.S. Pat. No. 11,794,770, other aspects of vehicle operation can be modified in view of a user's hearing loss such as converting audible alerts into text alerts on a display screen, using haptic signaling, and/or enhancing alerts for partially or directionally challenged hearing impaired drivers.

Hearing assistance systems have not successfully addressed situations in which a hearing impairment is asymmetrical (i.e., unequal between the left ear and right ear). Such a differential hearing loss can result from physiologic conditions of a user affecting one ear more than the other (which remains constant during a particular driving event) or from artificial obstruction of one ear of a user by an object (which may move into or out from a blocking position at any time). Such an object may be a pillow, neck support, ear bud, or a wireless mobile phone held over one ear, for example. The obstructing object might attenuate vehicle-generated sounds propagating toward the ear and/or generate competing sounds which drown out the vehicle-generated sounds.

Vehicle-generated sounds are typically produced using arrays of loudspeakers disposed around and within the passenger cabin to generate a sound field containing directional content. Examples include (i) stereo or surround music with a left channel, right channel, and possibly other channels (e.g., center channel) sent to corresponding speakers on left, right, or center positions in the passenger cabin and (ii) reproduction of siren sounds picked up by an exterior microphone via the speaker(s) aligned with the source of the siren sounds. Audio signals are generated according to an assumption that a listener's hearing is symmetrical with respect to their left and right ears. Especially when audio content played to a particular seating location is generated with a directional element (e.g., alert signals generated by a subset of the loudspeakers in the vehicle coinciding with the direction toward an alert siren), such an assumption may lead to a decreased ability for the user with a differential hearing loss to hear it.

In other situations, an audio signal may be generated primarily for a user in a particular seating location. Microphones mounted in the interior of the passenger cabin may be used to pick-up the speech of a person in one location (e.g., in a back row of seats) for reproduction from just a loudspeaker close to a different location (e.g., the driver's seat in a front row) to make conversations easier and more effective in a loud environment. For a user with a differential hearing loss, however, the closest loudspeaker may correspond to their nondominant ear such that the intended benefit is not fully realized.

SUMMARY OF THE INVENTION

The present invention can customize audio alerts by performing sound distribution according to individual needs arising from asymmetric (differential left/right) hearing loss. Vehicle smart sensors can detect the presence and seating position of occupants, identify hearing limitations of the occupants, and adjust the delivery of sound accordingly. For example, if an occupant has a hearing impairment in the right ear, transmitted sounds may be focused to the "good" ear on the left side. As used herein, a user's ear corresponding to the greatest loss is referred to as the nondominant ear and the other ear is referred to as the dominant ear.

In some embodiments, communication with a differentially hearing impaired user is facilitated when interacting with people outside the vehicle when the vehicle is stopped or moving slowly. For example, during traffic stops or moving near parking attendants, first responders, law enforcement, etc., exterior microphones can receive sounds or speech from outside and then convey it to the user's dominant ear regardless of the direction toward the source of the sound.

The apparatus and methods of the invention may utilize components and systems that may already be present in most vehicle designs such as smart sensing systems, multiple speaker arrays, adaptive audio systems, interior and exterior microphones, advanced microcontrollers, and V2X communication. The differential hearing conditions of users can be detected using users profiles (if available), manual input, or user monitoring. Monitoring can be used to detect either physiologic hearing loss or obstruction-induced (i.e., conductive) hearing loss using smart audio/vision detection systems in the vehicle (e.g., cameras and computational models based on Artificial Intelligence and/or Machine Learning). Once an occupant with impaired hearing is identified, then the ear with concern will be classified as a nondominant ear and the level of impairing may be estimated. In some embodiments, the evaluation of hearing loss may be a subjective evaluation based on transmitted sound levels and the user's response to them (which are utilized as part of the learning data for empirical or AI/ML models to estimate the user's comfort sound level).

For some embodiments, sound modification may be made only for the driver of the vehicle. For example, outside ambient sounds (which the driver might not hear) picked up by exterior microphones on the side of the vehicle corresponding to the driver's nondominant ear can be blended into audio playing from a speaker on the opposite side of the driver which directs the sounds to the dominant ear (e.g., if outside sound is coming from the right side and the driver has a bad right ear, then the picked-up audio is blended onto the audio playing on an inside left loudspeaker).

For passengers, differential hearing impairment can be detected in order to target the dominant ear for one or more of the passengers. The targeting may utilize zones in vehicle to focus certain sounds. To avoid negative impacts on other passengers and/or to provide improved performance when more than one asymmetrically impaired occupant is present, a strategy is provided to manage seating locations for the occupants according to their hearing quality (e.g., seating dominant right ears on one side of the passenger cabin and seating dominant left ears on other side). For autonomous vehicles which can have reconfigurable seating arrangements including the possibility of rotating seats by 180 degrees (e.g., into forward-looking and rearward-looking positions), occupants can be rotated so that their dominant ear faces an amplified sound. This would reduce having to physically shuffle people around. Furthermore, occupants may be seated to achieve natural noise reduction when large ambient noises are coming from one side of the vehicle (e.g., road construction) by orienting one or more occupants with their nondominant ear facing the side with the construction noises. The open/closed state of windows can also be controlled to selectively protect dominant ears from outside noises.

In some embodiments, a user's mobile wireless device (e.g., smartphone) can be used in either the pick-up of sounds or the delivery of audio to particular users having the asymmetric hearing loss. For example, the smartphone could be used to pick up sounds emanating on a nondominant ear and feeding them wirelessly to the vehicle audio system for reproduction by a cabin speaker on the side of the dominant ear.

In one important aspect of the invention, a transportation vehicle comprises a passenger cabin defining an interior, an exterior, and a plurality of seating positions in the interior. Each seating position defines a respective left side and a respective right side for respective persons seated at the respective seating position. An array of speakers is disposed within the passenger cabin for directing reproduced sounds toward the seating positions from respective directions. An auditory classifier is responsive to a particular user seated in a respective seating position for identifying a dominant ear and a nondominant ear for the particular user when there is a differential hearing loss between a right ear and a left ear of the particular user. A sound source generates electrical audio signals to be sent to the array of speakers for reproduction in the passenger cabin. An audio modifier is configured to differentially adjust the audio signals sent to the array of speakers such that reproduced sounds directed to the nondominant ear are attenuated in relation to the reproduced sounds directed to the dominant ear. In some embodiments, the relative attenuation means that audio signals corresponding to sounds that would normally be directed to the nondominant ear are steered (i.e., diverted) to at least one of the speakers that is directed to the dominant ear.

DETAILED DESCRIPTION OF PREFERRED EMBODIMENTS

Figure 1:
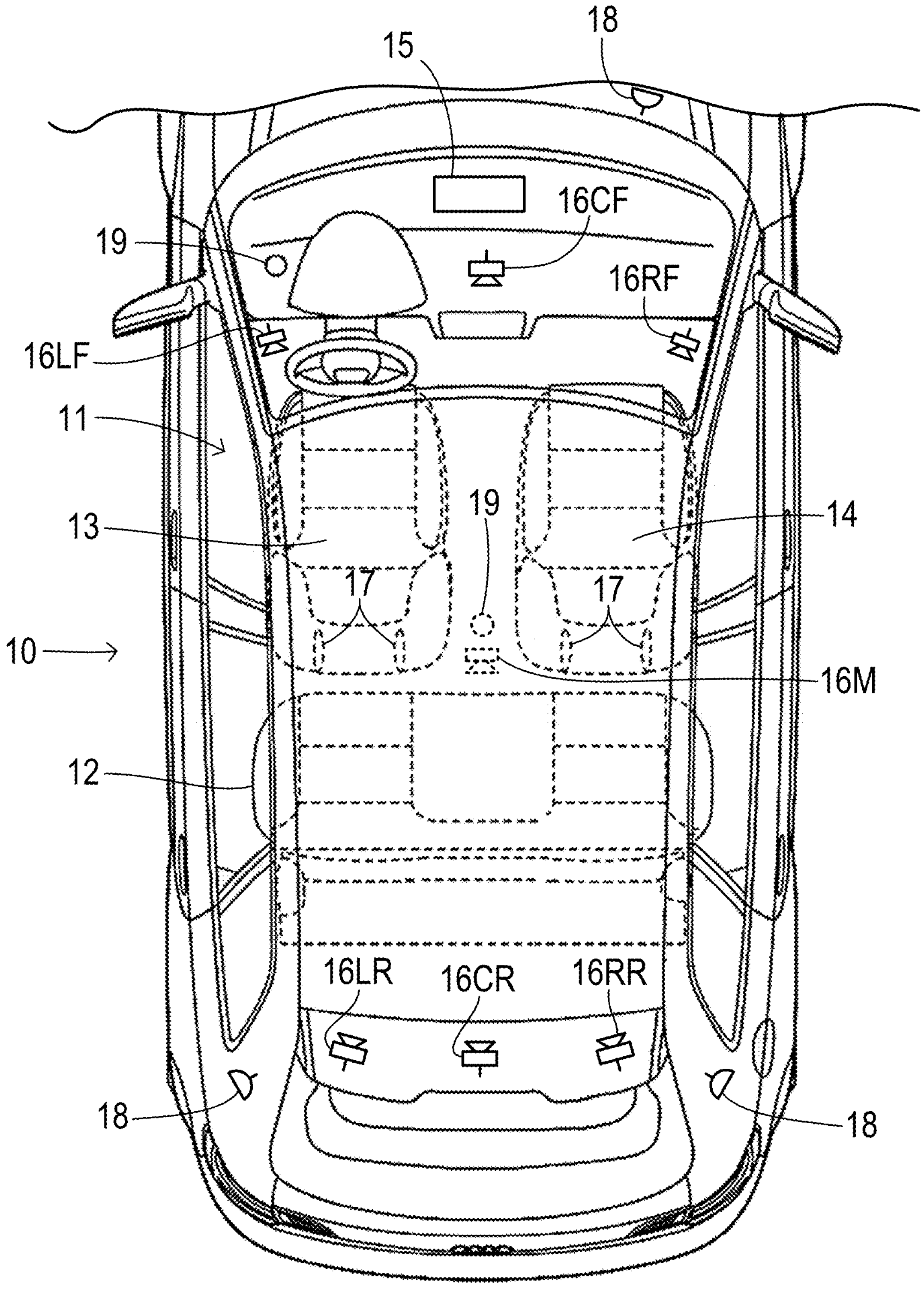
FIG. 1 is a top view of a vehicle having a passenger cabin with an array of loudspeakers useful in the present invention.

Referring to FIG. 1, a vehicle 10 has a passenger cabin 11 including a rear seating row 12, a front driver seat 13, and a front passenger seat 14 for accommodating vehicle occupants. A control module 15 may perform audio processing and other electronics functions in concert with a system of smart sensors and actuators (not shown) as known in the art. Control module 15 may provide an audio source or may be coupled with other distinct sources such as a media player (not shown). An array of loudspeakers 16 is disposed within the passenger cabin for generating acoustic sounds in response to audio signals from controller 15 or other audio components such as a power amplifier. Speaker array 16 directs reproduced sounds toward the seating positions in seats 12-14 from respective directions. Array 16 is shown to include a left-front speaker 16LF, center-front speaker 16CF, right-front speaker 16RF, left-rear speaker 16LR, center-rear speaker 16CR, right-rear speaker 16RR, and middle speaker 16M. Array 16 may further include speakers 17 mounted in headrests of the seats and/or speakers at other appropriate locations throughout cabin 11. For each seating location, there are speakers which are mainly directed toward an occupant's left ear and other speakers which are mainly directed toward the occupant's right ear.

Vehicle 10 further contains an array of microphones. Exterior microphones 18 are provided along exterior surfaces of vehicle 10 to receive outside sounds arriving from respective directions. Interior microphones 19 may transduce voice signals from speech conducted within cabin 11, for example. Electrical signals from microphones 18 and 19 may be coupled to control module 15 to be used as source audio signals and/or for other purposes such as evaluating differential hearing loss.

Figure 2:
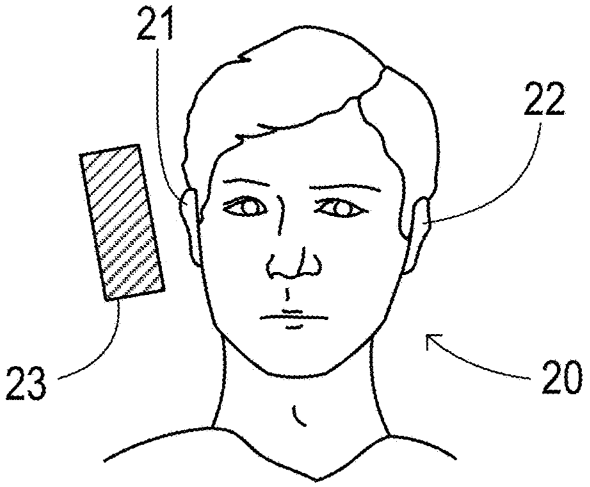
FIG. 2 is a schematic view of a particular user for whom a sound-blocking obstruction is located near one ear which blocks or reduces sound propagation to the one ear and thereby causes a differential hearing loss.

FIG. 2 depicts a user (i.e., vehicle occupant) 20 having a right ear 21 and a left ear 22. User 20 may or may not have hearing loss, but in this case is subject to a sound-blocking obstruction 23 in proximity to right ear 21. During times when obstruction 23 limits sound propagation to right ear 21, user 20 might miss important information such as priority audio content such as alerts or spoken conversation of others inside or outside the vehicle. In particular, the problem may be especially troublesome when the audio content would normally only be directed toward user 20 from the right side (i.e., is less likely to be heard via the dominant left ear).

Figure 3:
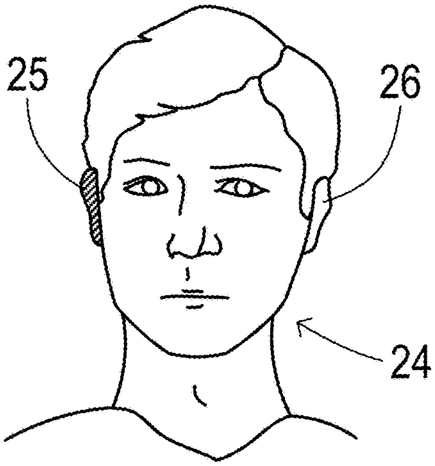
FIG. 3 is a schematic view of a particular user for whom a physiologic condition causes a differential hearing loss.
Figure 4:
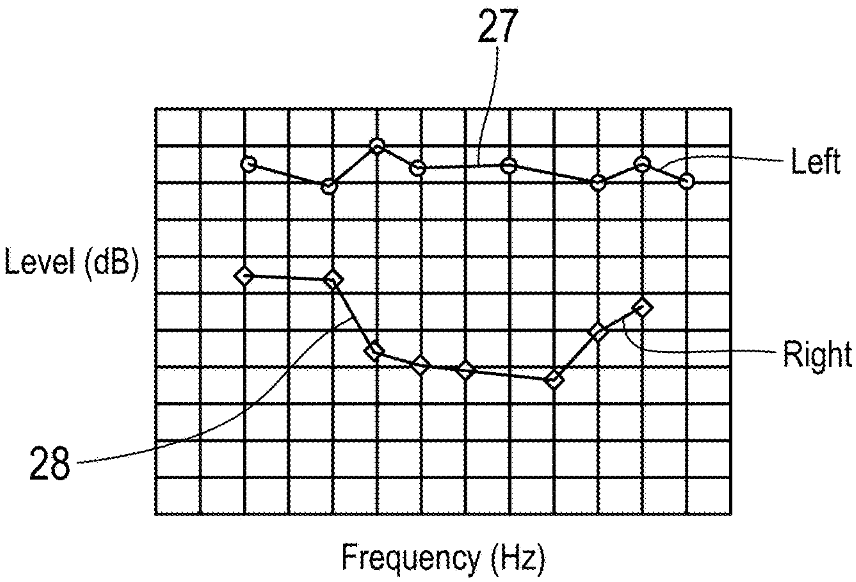
FIG. 4 is an audiogram showing a differential hearing loss.

FIG. 3 depicts a user 24 having a right ear 25 and a left ear 26. Due to physiologic conditions, user 24 has a differential hearing loss such that left ear 26 is dominant and right ear 25 is nondominant. FIG. 4 shows a corresponding audiogram showing a left ear response 27 such that quiet sounds are audible and a right ear response 28 such that sound must be much louder in order to become audible to user 24 across a wide range of frequencies.

Figure 5:
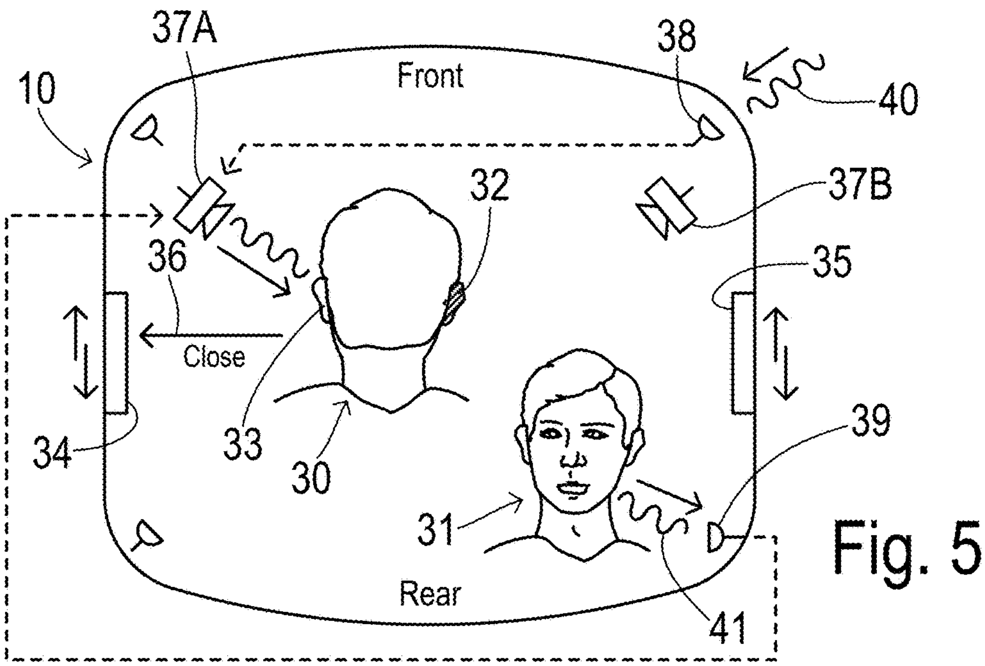
FIG. 5 is a schematic diagram showing one embodiment of directing sounds in a passenger cabin toward a dominant ear of a user.

FIG. 5 shows a first embodiment of the invention wherein certain sounds which are generated for being reproduced to be heard by a driver are redirected to a dominant ear. Vehicle 10 (with a front end and a rear end, as labeled) has a passenger cabin for accommodating a driver 30 in a driver seat location and a passenger 31 in a passenger seat location. Driver 30 has a differential hearing loss between a right ear 32 and a left ear 33, such that left ear 33 is a dominant ear and right ear 32 is a nondominant ear. When a sound source generates a priority audio content associated with occurrence of a predetermined event, then audio signals for the priority audio content are steered by an audio modifier to a speaker which is oriented toward the dominant ear.

Powered windows 34 and 35 are located on the left and right sides of vehicle 10 which can be raised and lowered via an electronic controller (not shown). In some embodiments, window 34 may be automatically closed via a Close command 36 directed to powered window 34 to reduce outside noises propagating through window 34 during the playing of sounds to adjacent ear 33 of driver 30.

A speaker array 37 includes a left-front speaker 37A which directs reproduced sounds toward the driver seating position from a leftward direction (i.e., toward left ear 33), and a right-front speaker 37B which directs reproduced sounds toward the driver seating position from a rightward direction (i.e., toward right ear 32).

The redirecting or emphasizing of sounds toward the dominant ear (e.g., left ear 33) of driver 30 can be done with any sound source whether the sounds are live or recorded or whether the sounds are for alerting, entertainment, or any other purpose. FIG. 5 shows examples of live sounds using sound sources including at least one exterior microphone 38 and at least one interior microphone 39. Exterior microphone 38 may receive relevant sounds 40 such as sirens or vocalizations of persons in the area of vehicle 10 coming from the right side of vehicle 10. Known systems have amplified the received sounds and replayed them inside the passenger cabin using interior speakers closest to the receiving microphone (e.g., speaker 37B). Since nondominant ear 32 faces the sounds (i.e., both the original sounds penetrating the cabin and the reproduced sounds from speaker 37B), and since the head of driver 30 would block a large portion of the sound from reaching dominant ear 33, the sounds may not be heard well. To improve the audibility, the invention instead directs all or some of the received sounds to speaker 37A which can be better heard by driver 30. More generally, an audio controller or modifier may adjust audio signals to the speakers such that a sound level of a first speaker directed toward the dominant ear is increased or a sound level of a second speaker directed toward the nondominant ear is decreased in order to produce the desired directionality. Furthermore, if window 34 is open and there may be undesirable outside noises which could compete with the redirected sounds (e.g., when the vehicle is moving above a threshold speed), then window 34 can be automatically closed.

In another example, vocalizations from passenger 31 may provide live sounds 41 to be played to driver 30. Interior microphone 39 acts as a source for electrical audio signals from transducing sounds 41. The electrical audio signals are processed by an audio processor/amplifier (not shown) and sent to speaker 37A for playing to dominant ear 33 regardless of the actual direction between driver 30 and passenger 31.

Figure 6:
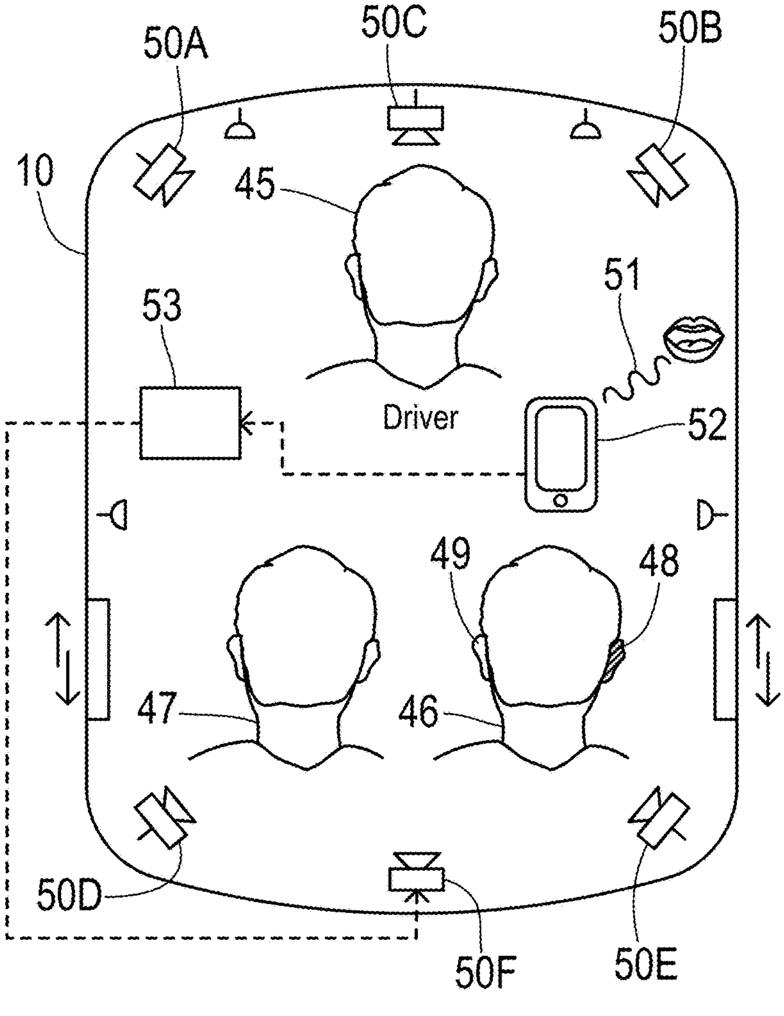
FIG. 6 is a schematic diagram showing another embodiment of directing sounds in a passenger cabin toward a dominant ear of a user.

FIG. 6 shows an example wherein the person having a differential hearing loss between their right and left ears is a passenger other than the driver. The passenger cabin of vehicle 10 in FIG. 6 contains a driver 45 in a driver seating location and passengers 46 and 47 in rear seating locations. Passenger 46 has a nondominant ear 48 and a dominant ear 49. A speaker array 50 has a left-front speaker 50A, a right-front speaker 50B, a center-front speaker 50C, a left-rear speaker 50D, right-rear speaker 50E, and a center-rear speaker 50F. By directing relevant audio signals to center-rear speaker 50F, reproduced sounds can be directed to dominant ear 49 of passenger 46. By virtue of the layout of speaker array 50, any reproduced sounds can be directed to either the right or left ear of a person seated in any of the available seating locations by (i) selecting a speaker with the shortest unblocked path to the dominant ear, or (ii) using a combination of speakers to produce a combined sound that is focused toward the dominant ear, for example.

FIG. 6 shows another example of a sound source deriving live sounds. Vocalizations 51 from any other one of the occupants of vehicle 10 may be received by a mobile wireless device 52 such as a smartphone. Transduced audio signals can be wirelessly transmitted to an audio processor 53 which directs electrical audio signals representing the vocalizations to speaker 50 for playing them toward dominant ear 49. As in the previous embodiment, sounds from other sound sources including live sounds from interior or exterior microphones or remote sources and recorded sounds from media players can be used to obtain the audio signals to be differentially adjusted to direct them to the dominant ear. Furthermore, automatic window operation can be used, especially when a dominant ear targeted by particular sounds is close to an open window.

Figure 7:
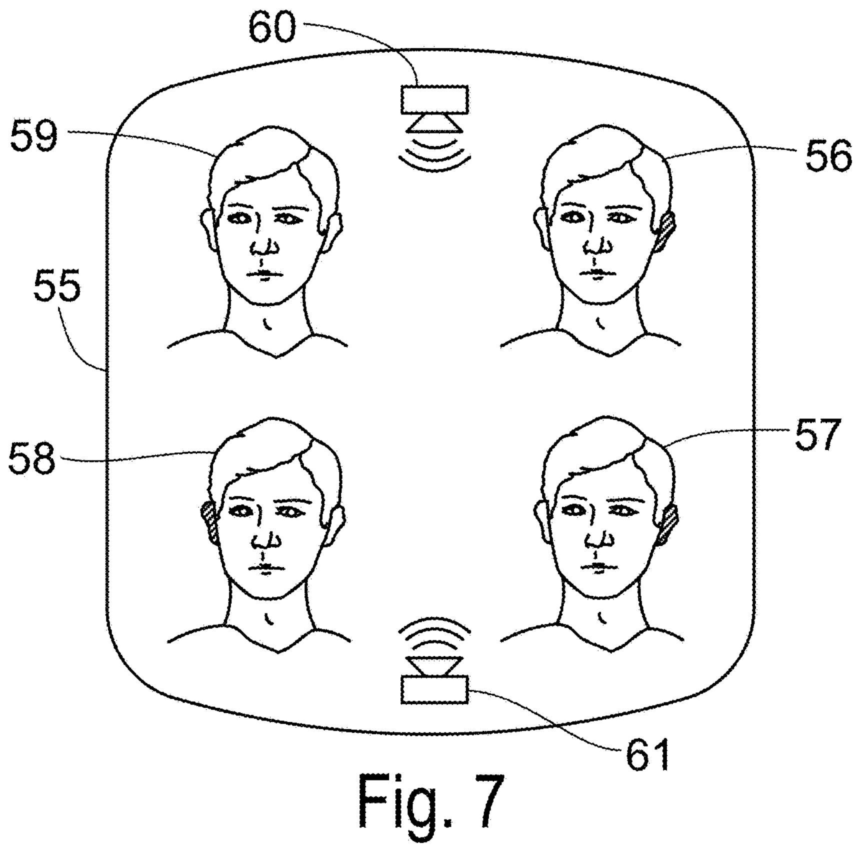
FIG. 7 is a schematic diagram showing a facilitated seating arrangement for multiple users in the passenger cabin in order to direct sounds toward the dominant ears of the users when there is more than one user with the differential hearing loss.

In some instances, a vehicle controller may determine that more than one occupant of a vehicle is subject to a differential hearing loss. To most effectively manage the differential adjustment of audio signals (i.e., the relative attenuation of audio signals so they are directed to the dominant ears), whenever an auditory classifier detects dominant ears for a plurality of occupants within the transportation vehicle, then a seating controller may analyze the sides of the dominant ears for the plurality of occupants and then presents a recommended seating arrangement of the plurality of occupants. In the case of a passenger cabin having rotatable seats which can be spun between forward-facing and rearward-facing orientations (e.g., by an electric motor), the seating controller may automatically implement the seating arrangement. The recommended seating arrangement may align at least two of the occupants so that their dominant ears are directed in common toward one or more of the speakers, which can help limit the modifications being applied to the audio signals. As shown in FIG. 7, a cabin 55 contains occupants 56, 57, and 58 having respective differential hearing losses (and an occupant 59 not having any differential hearing loss). In the illustrated recommended seating arrangement, all of occupants 56-58 have their dominant ears oriented toward a front-to-back centerline of cabin 55. In order to simultaneously ensure that reproduced sounds being directed to the dominant ears of occupants 56-58 are enhanced relative to the nondominant ears (i.e., reproduced sounds directed to the nondominant ears are attenuated in relation to the reproduced sounds directed to the dominant ear), front-center speaker 60 and/or front-rear speaker 61 receive the modified audio to direct the relevant sound along the centerline where the dominant ears are converged (provided that the recommended seating arrangement is implemented).

Figure 8:
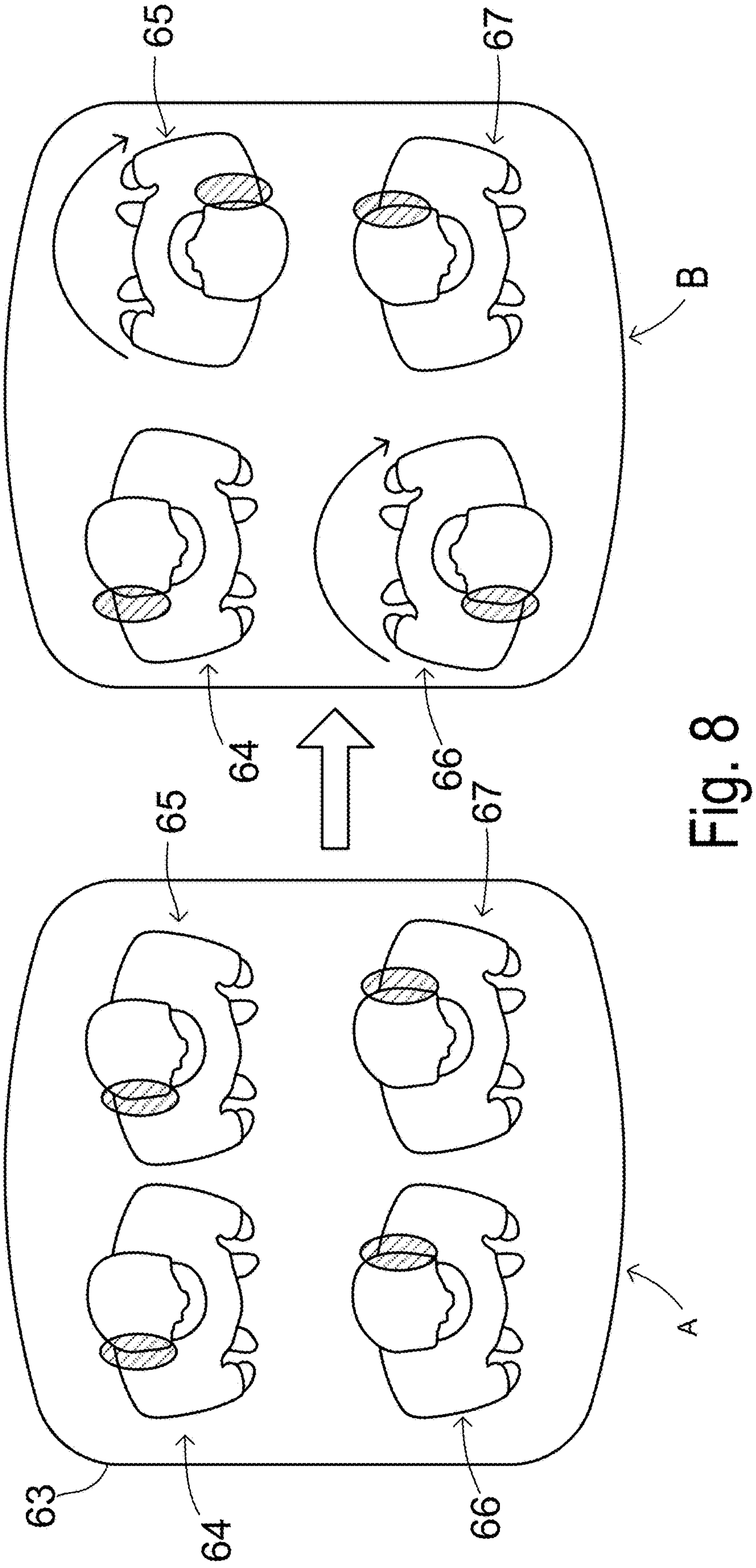
FIG. 8 is a schematic diagram showing one embodiment with a facilitated seating arrangement for multiple users in the passenger cabin wherein at least some seats are reconfigurable to allow a seated user to face in either a forward or a rearward direction of the vehicle.

FIG. 8 shows a passenger cabin 63 containing occupants (i.e., driver and passengers) 64-67 each having a respective differential hearing loss wherein each nondominant ear is shaded. In an initial seating arrangement A, the occupants are all facing the same direction and their dominant ears are not placed in proximity to each other. The seats (not shown) in cabin 63 are reconfigurable by 180 degrees of rotation. One recommended seating arrangement may comprise placing the dominant ears of all occupants along a centerline of cabin 63 as shown in seating arrangement B. In particular, rotatable seats of occupants 65 and 66 have been rotated by 180 degrees so that occupants 65 and 66 are facing an opposite direction from occupants 64 and 67.

Figure 9:
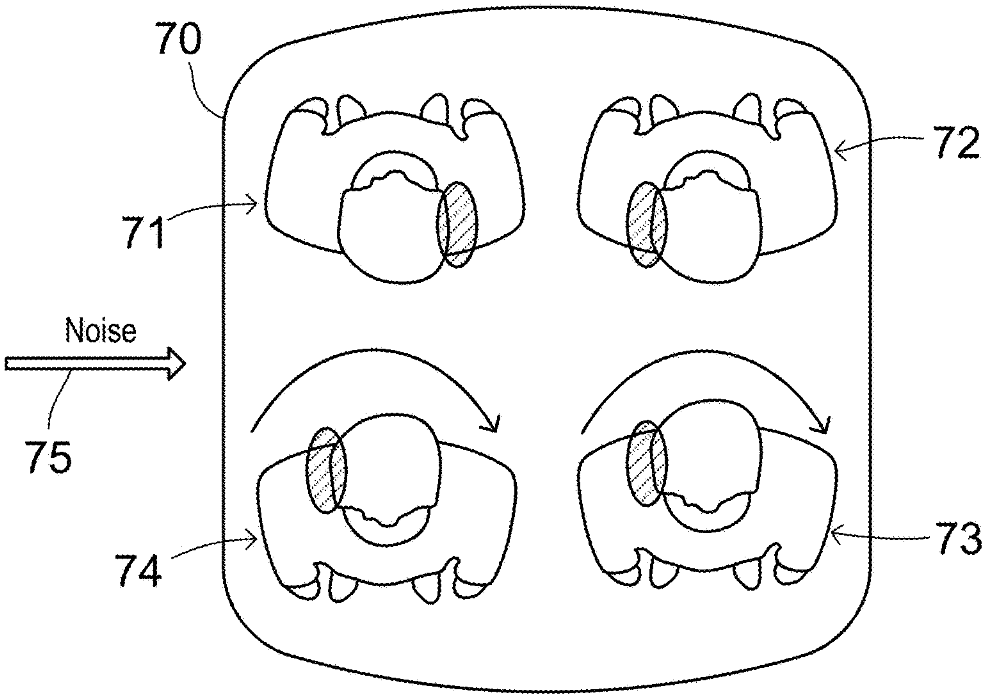
FIG. 9 is a schematic diagram showing another embodiment with a facilitated seating arrangement for multiple users in the passenger cabin wherein at least some seats are reconfigurable.

In addition to the times when a driver and passengers are initially being seated, reconfiguration of a seating arrangement can be performed in the present invention during a driving cycle in response to annoying outside noises (e.g., from construction or other activities concentrated on one side of the vehicle along a driving route). As shown in FIG. 9, a passenger cabin 70 includes occupants 71-74 with nondominant ears shaded and dominant ears unshaded. An outside noise 75 penetrates cabin 70 from a left side. Occupant 71 may be a driver, and therefore occupant 71 is kept facing the same direction even though it orients the dominant ear toward the undesired outside noises. All other occupants, however, can be repositioned if necessary to orient their nondominant ears toward the undesired noise. Thus, occupants 73 and 74 are shown with their seats rotated accordingly.

Figure 10:
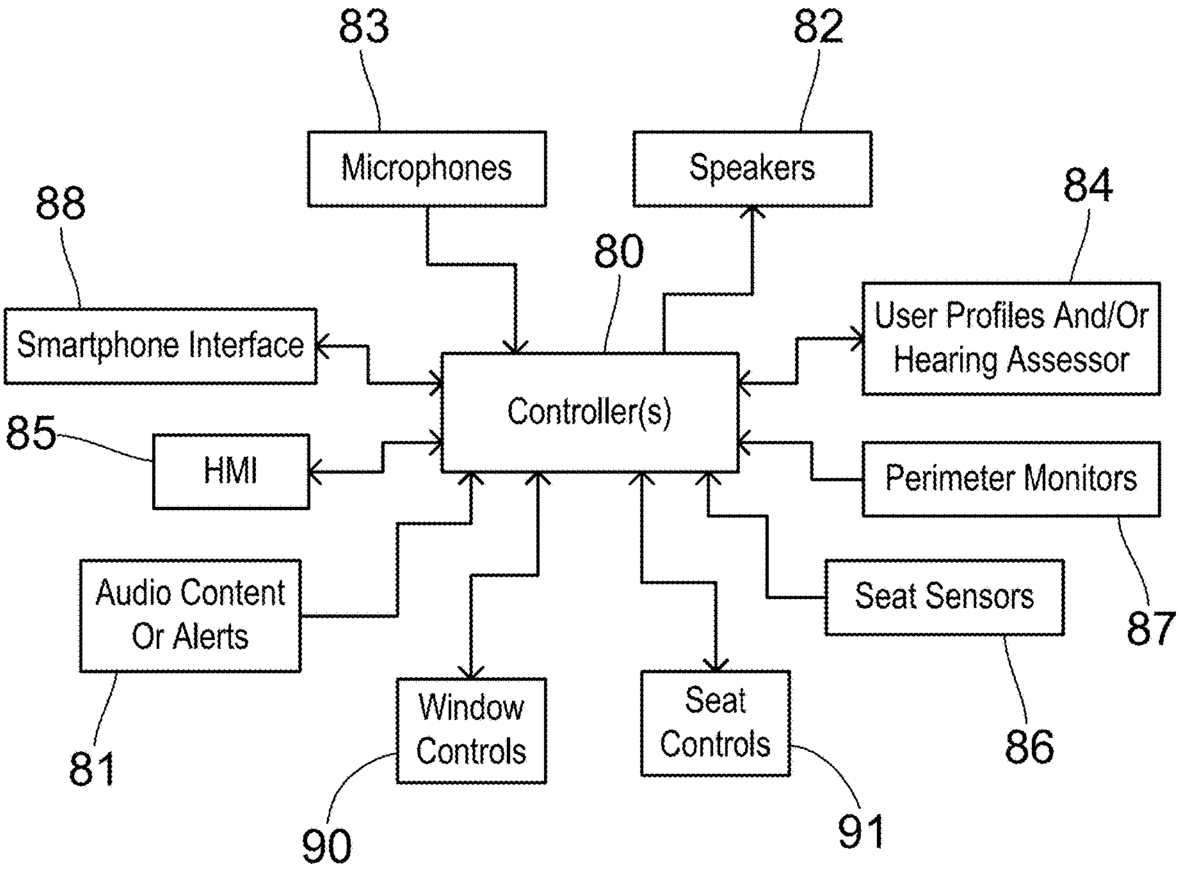
FIG. 10 is a block diagram showing vehicle systems in greater detail.

FIG. 10 provides a block diagram showing relevant portions of a vehicle in greater detail. A main controller 80 may be implemented using one or more electronic modules and my typically include general purpose microprocessor(s) and memories with appropriate software and/or firmware instructions. As configured herein, controller 80 may function as an audio processor, auditory classifier, and audio modifier as described herein. Controller 80 is coupled to a sound source 81 which provides electrical audio signals representing audio content or alerts which are to be reproduced for being heard by a driver and/or passengers in a vehicle. Controller 80 is coupled to a speaker array 82 disposed within the passenger cabin for directing reproduced sounds toward the seating positions of vehicle occupants from respective directions. Arrays of microphones 83 (which may include interior and/or exterior microphones for picking up interior and exterior sounds, respectively) are also coupled to controller 80 to function as sound sources.

For an auditory classification function, controller 80 is coupled to an assessor block 84 which may store user profiles for specific individuals to relate their identities to respective differential hearing loss parameters. The parameters can be loaded via a human-machine interface (HMI) 85 such as a touchscreen display panel. Alternatively, block 84 may measure differential hearing loss of vehicle occupants using a specific guided procedure or may monitor the behavior (e.g., reactions to sounds) of an occupant over time. For example, factors such as user head orientation or movement while listening to replayed audio, typical listening volume, and speaker left-right balance or front-rear fade settings can be input to an artificial intelligence or machine learning model to estimate a differential hearing loss to be associated with a particular user. A seat sensor and interior monitoring block 86 may include cameras and other sensors to determine a user's identity and their behaviors.

In addition to accepting manual input of differential hearing loss parameters and/or identifying information from users, HMI 85 may be used to present recommended seating arrangements according to the placements of dominant ears of the vehicle occupants as explained above.

Whenever a seated user is detected, controller 80 may perform an auditory classification function to evaluate a particular user seated in a respective seating position and identify whether they have a dominant ear and a nondominant ear resulting from a differential hearing loss. Based on the differential loss, controller 80 may differentially adjust audio signals being sent to speaker array 82 such that reproduced sounds directed to the nondominant ear are attenuated in relation to the reproduced sounds directed to the dominant ear. Because of the adjustment, a sound level of a first speaker directed toward the dominant ear is increased or a sound level of a second speaker directed toward the nondominant ear is decreased. In particular, the sound level of the first speaker may be increased in proportion to a magnitude of the differential hearing loss. In some embodiments, an audio signal from the sound source which is initially intended for a first speaker that is oriented toward the nondominant ear is redirected to be reproduced by a second speaker that is oriented toward the dominant ear. In some embodiments, the adjustment is applied to priority audio content associated with occurrence of a predetermined event, such as a siren sound or vocalizations of persons located outside and close to the vehicle. The audio signals for the priority audio content are steered by the audio modification function to a speaker which is oriented toward the dominant ear even if the direction does not correspond to the direction at which the initial sound source is located. Thus, priority audio content may be comprised of sounds detected by a microphone located on a side of the transportation vehicle opposite from the particular user's dominant ear at a time when a person outside the transportation vehicle attempts to communicate with the particular user.

Perimeter monitors 87 such as camera image sensors, ultrasonic sensors, lidar, or radar are coupled to controller 80 for detecting external circumstances such as a nearby person interacting with a vehicle.

Controller 80 is further coupled to a smartphone interface 88 to provide a communication link with mobile smartphones carried by vehicle occupants. Accordingly, the smartphones can serve as a sound source in the vehicle as described above.

Controller 80 is coupled to window controls 90 for automatically raising an opened window when needed to maximize audibility of audio content directed to a dominant ear of a user. For example, controller 80 closes an open window adjacent the respective seating position of the particular user when the dominant ear is facing toward the open window and a level of ambient noise entering the open window is above a predetermined threshold (e.g., as measured by interior and exterior microphones).

Furthermore, controller 80 is coupled to seat controls 91 when reconfigurable seats are available, whereby controller 80 can automatically change an orientation of one or more users so that the dominant ears are collectively oriented toward common loudspeakers.

What is claimed is:

1. A transportation vehicle comprising:

a passenger cabin defining an interior, an exterior, and a plurality of seating positions in the interior, each seating position defining a respective left side and a respective right side for respective persons seated at respective seating positions;

an array of speakers disposed within the passenger cabin for directing reproduced sounds toward the seating positions from respective directions;

an auditory classifier responsive to a particular user seated in a respective seating position for identifying a dominant ear and a nondominant ear for the particular user when there is a differential hearing loss between a right ear and a left ear of the particular user; and a sound source generating electrical audio signals to be sent to the array of speakers for reproduction in the passenger cabin; and an audio modifier configured to differentially adjust the audio signals sent to the array of speakers such that reproduced sounds directed to the nondominant ear are attenuated in relation to the reproduced sounds directed to the dominant ear, wherein the differential hearing loss results from a sound-blocking obstruction in a vicinity of the particular user, and wherein the auditory classifier is comprised of a cabin monitor for detecting and tracking the sound-blocking obstruction.

2. The transportation vehicle of claim 1 wherein the audio modifier adjusts the audio signals such that a sound level of a first speaker directed toward the dominant ear is increased or a sound level of a second speaker directed toward the nondominant ear is decreased.

3. The transportation vehicle of claim 2 wherein the sound level of the first speaker is increased in proportion to a magnitude of the differential hearing loss.

4. The transportation vehicle of claim 1 wherein the audio modifier adjusts the audio signals such that an audio signal from the sound source which is initially intended for a first speaker which is oriented toward the nondominant ear is redirected to be reproduced by a second speaker which is oriented toward the dominant ear.

5. The transportation vehicle of claim 1 wherein the sound source generates a priority audio content associated with occurrence of a predetermined event, and wherein audio signals for the priority audio content are steered by the audio modifier to a speaker which is oriented toward the dominant ear.

6. The transportation vehicle of claim 5 wherein the priority audio content is comprised of a predetermined alert.

7. The transportation vehicle of claim 5 wherein the priority audio content is comprised of sounds detected by a microphone located on a side of the transportation vehicle opposite from the particular user's dominant ear at a time when a person outside the transportation vehicle attempts to communicate with the particular user.

8. The transportation vehicle of claim 1 further comprising a window controller configured to close an open window adjacent the respective seating position of the particular user when the dominant ear is facing toward the open window and a level of ambient noise entering the open window is above a predetermined threshold.

9. The transportation vehicle of claim 1 wherein the differential hearing loss is a physiologic condition of the particular user, wherein the auditory classifier includes user profiles which stores hearing losses according to personal identifiers, and wherein the auditory classifier obtains a personal identifier of the particular user in the passenger cabin to retrieve an associated differential hearing loss.

10. The transportation vehicle of claim 1 wherein the differential hearing loss is a physiologic condition of the particular user, and wherein the auditory classifier is configured to monitor reactions of the particular user to sound reproduction in the passenger cabin to determine the differential hearing loss.

11. The transportation vehicle of claim 1 wherein the cabin monitor is comprised of an image sensor.

12. The transportation vehicle of claim 1 wherein the sound source is comprised of a personal mobile wireless device in the transportation vehicle having a microphone and wirelessly transmitting the electrical audio signals so that they are coupled to the audio modifier.

13. The transportation vehicle of claim 1 wherein the auditory classifier determines dominant ears for a plurality of occupants within the transportation vehicle, wherein the transportation vehicle further comprises a seating controller receiving the determined dominant ears for the plurality of occupants and presents a recommended seating arrangement of the plurality of occupants which aligns at least two of the occupants so that their dominant ears are directed in common toward one or more of the speakers.

14. A transportation vehicle comprising:

a passenger cabin defining an interior, an exterior, and a plurality of seating positions in the interior, each seating position defining a respective left side and a respective right side for respective persons seated at respective seating positions;

an array of speakers disposed within the passenger cabin for directing reproduced sounds toward the seating positions from respective directions;

an auditory classifier responsive to a particular user seated in a respective seating position for identifying a dominant ear and a nondominant ear for the particular user when there is a differential hearing loss between a right ear and a left ear of the particular user; and a sound source generating electrical audio signals to be sent to the array of speakers for reproduction in the passenger cabin; and an audio modifier configured to differentially adjust the audio signals sent to the array of speakers such that reproduced sounds directed to the nondominant ear are attenuated in relation to the reproduced sounds directed to the dominant ear, wherein the auditory classifier determines dominant ears for a plurality of occupants within the transportation vehicle, wherein the transportation vehicle further comprises a seating controller receiving the determined dominant ears for the plurality of occupants and presents a recommended seating arrangement of the plurality of occupants which aligns at least two of the occupants so that their dominant ears are directed in common toward one or more of the speakers.

15. The transportation vehicle of claim 14 wherein the audio modifier adjusts the audio signals such that a sound level of a first speaker directed toward the dominant ear is increased or a sound level of a second speaker directed toward the nondominant ear is decreased.

16. The transportation vehicle of claim 15 wherein the sound level of the first speaker is increased in proportion to a magnitude of the differential hearing loss.

17. The transportation vehicle of claim 14 wherein the audio modifier adjusts the audio signals such that an audio signal from the sound source which is initially intended for a first speaker which is oriented toward the nondominant ear is redirected to be reproduced by a second speaker which is oriented toward the dominant ear.

18. The transportation vehicle of claim 14 wherein the sound source generates a priority audio content associated with occurrence of a predetermined event, and wherein audio signals for the priority audio content are steered by the audio modifier to a speaker which is oriented toward the dominant ear.

19. The transportation vehicle of claim 18 wherein the priority audio content is comprised of a predetermined alert.

20. The transportation vehicle of claim 18 wherein the priority audio content is comprised of sounds detected by a microphone located on a side of the transportation vehicle opposite from the particular user's dominant ear at a time when a person outside the transportation vehicle attempts to communicate with the particular user.

* * * * *